May 25, 1948.  B. G. CARLSON  2,442,116
AUTOMATIC PILOT TURN CONTROL
Filed March 3, 1944  3 Sheets-Sheet 1
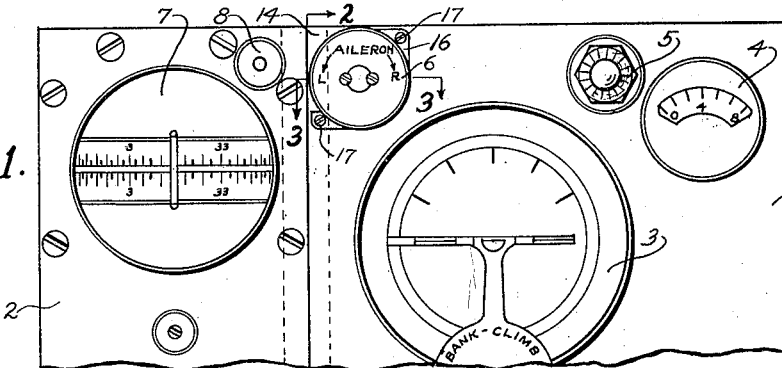
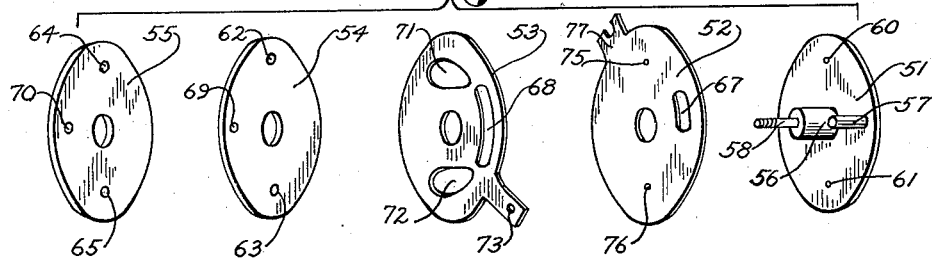
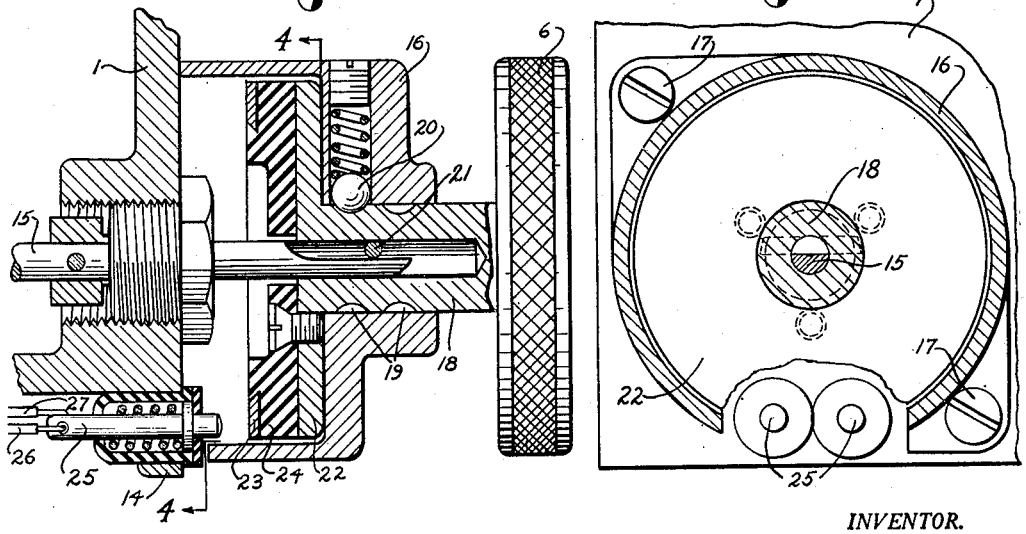
INVENTOR.
BERT G. CARLSON
BY
Frank H. Harmon
ATTORNEY

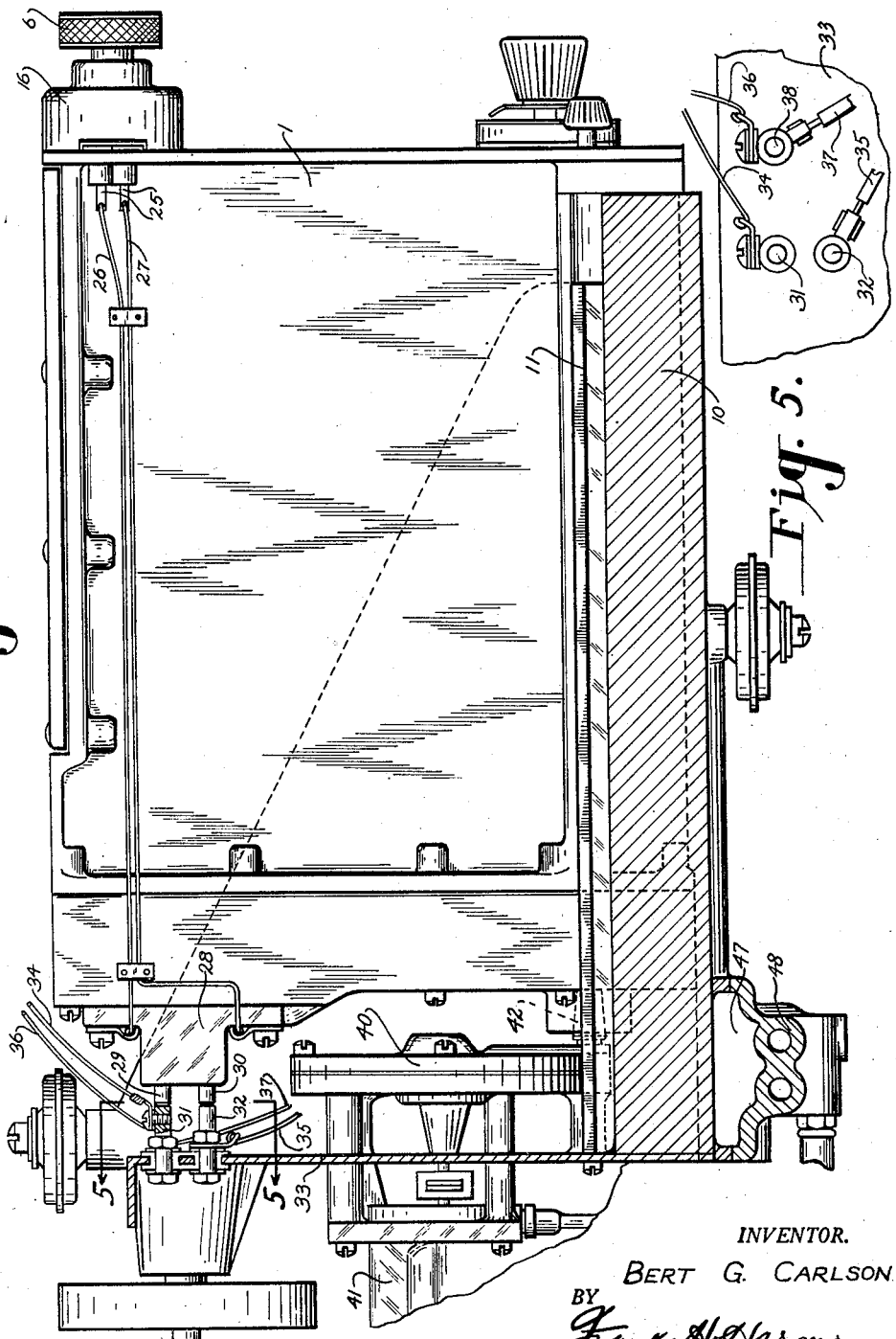

May 25, 1948.　　　B. G. CARLSON　　　2,442,116
AUTOMATIC PILOT TURN CONTROL
Filed March 3, 1944　　　3 Sheets-Sheet 3
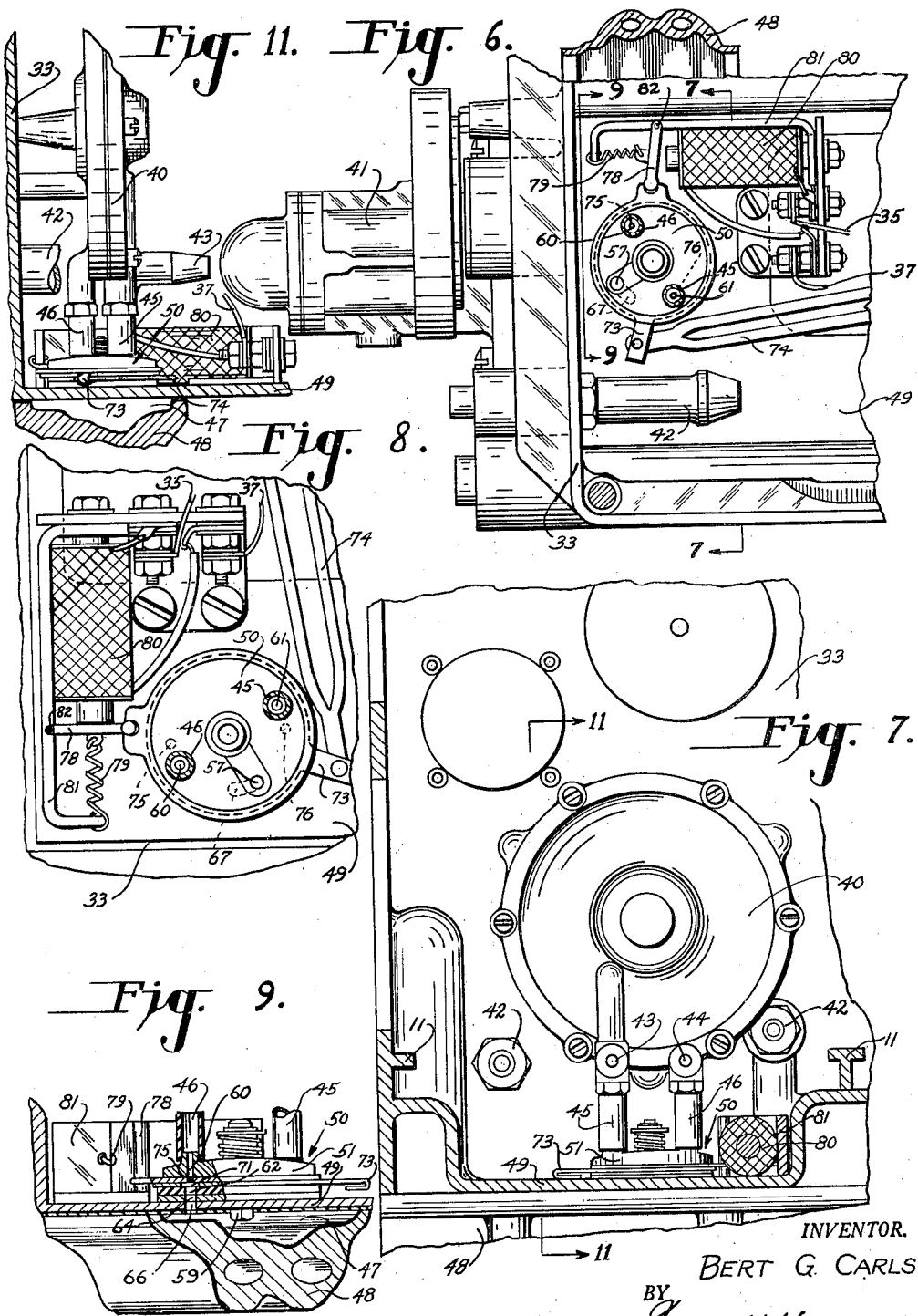
INVENTOR.
BERT G. CARLSON
BY
Frank H. Harmon
ATTORNEY Patented May 25, 1948

2,442,116

UNITED STATES PATENT OFFICE 2,442,116

AUTOMATIC PILOT TURN CONTROL

Bert G. Carlson, Gates Mills, Ohio, assignor, by mesne assignments, to Jack & Heintz Precision Industries, Inc., Cleveland, Ohio, a corporation of Delaware Application March 3, 1944, Serial No. 524,954

8 Claims. (Cl. 244—78)

This invention relates to a turn control for an automatic pilot for aircraft and has as its object to provide a device for temporarily removing the rudder control signal from the gyro turn unit when the aircraft is banked for a turn.

A further object is to provide a device of the type described which may be incorporated into a conventional automatic pilot.

The manner in which the invention accomplishes these and other objects is best understood by referring to the accompanying drawings in which:

Fig. 1 is a partial front elevation view of the front panels of a conventional automatic pilot having the device of the present invention applied thereto;

Figure 2 is a view taken on the line 2—2 of Figure 1 showing the bank and climb unit in side elevation and showing the mounting frame in section;

Figure 3 is an enlarged sectional view taken on the line 3—3 of Figure 1;

Figure 4 is a cross sectional view taken approximately on the line 4—4 of Figure 3;

Figure 5 is a fragmentary view in elevation of the electrical contact arrangement on the rear of the mounting frame, taken on the line 5—5 of Figure 2;

Figure 6 is a plan view of the rear portion of the mounting frame behind the turn unit, certain parts being omitted;

Figure 7 is a sectional view in front elevation of the rear portion of the mounting frame taken on the line 7—7 of Figure 6;

Figure 8 is a fragmentary plan view of the solenoid operated air valve shown in Figure 5 with the parts in a different position and drawn to a larger scale;

Figure 9 is a sectional view in rear elevation taken on the line 9—9 of Figure 6 and looking in the opposite direction from Figure 7;

Figure 10 is an exploded view of the combined metering and signal removing valve shown in Figures 6 to 9; and Figure 11 is a sectional view taken in side elevation approximately on the line 11—11 of Figure 7.

Environment of the invention

Referring now to Figure 1, the numeral 1 refers to the bank and climb unit and the numeral 2 refers to the turn unit of a conventional automatic pilot. On the face of the bank and climb unit there is a window 3 containing the bank and climb indicators, a vacuum gage 4, and an elevator control knob 5, all in conventional form and arrangement. The aileron control knob 6 is located in the normal position but has incorporated therewith certain features of novelty pertaining to the invention and referred to in detail in the following description. The turn unit 2 has a face 7 containing the usual upper and lower compass cards, and the usual rudder control knob 8.

The units 1 and 2 are mounted in a conventional manner in a mounting frame 10 so as to be conveniently removable therefrom. The usual manner of supporting the bank and climb unit and turn unit is to provide locating guide rails such as 11 in the mounting frame to slidably receive the units 1 and 2 in such a manner that when the units are supported on the rails and pushed back into place, the various air line fittings in the rear of the units will be automatically connected with similarly positioned fittings on the mounting frame. In this manner the turn and bank and climb boxes may conveniently be removed from the mounting frame by merely withdrawing the units forwardly from the rails 11. The mechanism of the present invention is incorporated in the units 1 and 2 and the mounting frame 10 in such a way that the removability and exchangeability of the units is not impaired, all connections with the removable units being established and broken automatically by the mere act of inserting or removing the boxes from the mounting frame.

The features of novelty will now be described as they are applied to the bank and climb unit and the mounting frame of a gyro pilot.

Bank and climb unit

Referring now to Figures 3 and 4, numeral 15 indicates the usual aileron control shaft connected with the follow-up mechanism for controlling banking of the aircraft through the gyro pilot. A housing 16 adapted to be secured to the box 1 by screw 17 or the like surrounds and encloses the forward end of the shaft 15 and rotatably supports a banking knob 6 in non-rotative engagement with said shaft. The knob 6 is carried on a hub 18 axially slidable in the casing 16 and provided with a pair of annular grooves 19 adapted to be engaged by a resilient ball detent 20 to releasably hold the knob 6 for rotation in either of two axial positions. A pin 21, through the hub 18, engages a flat side of the shaft 15 to key the hub and shaft together regardless of the longitudinal position of the knob 6. The inner end of the hub 18 carries a disc 22 supporting an annular conducting ring 23 on an insulating body 24 with one side of the ring 23 overlying a side flange 14 on the box 1 beyond the side wall thereof. A pair of spring actuated contacts 25 are mounted in the flange 14 so as to underlie the ring 23 as shown. When the knob 6 is withdrawn to its outer position it operates in the conventional manner to rotate the aileron control shaft 15 without bringing any part of the present invention into operation. When the knob 6 is depressed to the inner position, the ring 23 is brought into contact with the terminals 25 to establish an electrical circuit therebetween, the knob still being freely rotatable for aileron control.

A pair of conductors 26 and 27 connected with the terminals 25 are trained along the side of the box 1 and are connected with a terminal block 28 mounted on the rear thereof as shown in Figure 2. The terminal block 28 carries a pair of spring contacts 29 and 30 adapted for resilient engagement with a pair of terminal posts 31 and 32 mounted on the rear wall of the mounting frame 10. Conductors 34 and 35 are connected with the terminals 31 and 32 respectively, and conductors 36 and 37 are connected to a binding post 38 having no direct connection with the box 1. The arrangement of the terminals 31 and 32 and the binding post 38 is shown in Figure 5. Further reference will be made to the circuit connections as the description proceeds.

*Mounting frame*

The description under the preceding heading relates to those portions of the present device which are mounted on or associated with the bank and climb unit 1. Reference is now made to Figures 6 to 11 inclusive relating to those parts of the device which are carried by the mounting frame 10 and associated with the turn unit 2. Figures 6 and 7 illustrate in plan and front elevation, respectively, the rear part of the mounting frame 10 below and directly behind the turn unit 2. Numerals 40 and 41 refer respectively to the air relay and the balanced oil valve associated with the gyro turn unit for controlling the rudder actuating piston in the servo unit, not shown. The numeral 42 designates pipes on the mounting frame rear wall 33 to establish air pressure and vacuum line connections with the turn unit box when the latter is in position in the mounting frame. In Figures 6 and 7 the turn unit box 2 has been removed to expose certain features in the mounting frame presently to be described.

The air relay 40 carries the usual rudder air relay connection fittings 43 and 44, shown in Figures 7 and 11, adapted to make connection with mating fittings on the rear of the turn unit box 2, and short hose connections 45 and 46 leading to an atmospheric pressure chamber 47 in a manifold 48 under the floor 49 of the mounting frame 10. According to conventional construction, the connections 43 and 45 are in communication with a chamber on one side of a flexible diaphragm in the air relay valve 40, and the connections 44 and 46 are in communication with a chamber on the opposite side of the diaphragm, the diaphragm being directly connected with a piston-like movable valve member in a balanced oil valve 41 extending rearwardly of the rear wall 33. The air relay 40 is disposed on the front side of the rear wall 33 and has been omitted in Figure 6, along with one of the pipes 42, to expose other parts presently to be described.

In a manner well understood in the art, flexible hose connections constituting the elements 45 and 46 normally admit an air flow from the atmospheric pressure chamber 47 to the chambers on opposite sides of the flexible diaphragm in air relay 40 and to the turn unit air pick-off system in the box 2. Air flow to the pick-off system is established through fittings 43 and 44 whereby the signal produced by this system effects a differential pressure responsive movement of the air relay diaphragm acting through the balanced oil valve and servo system to apply rudder control until the signal is removed. In normal operation this signal is removed, or altered, by the pick-off system from time to time in accordance with its response to the movements of the aircraft. In the present invention, a combined metering and shutoff valve is interposed in the hose connections 45 and 46 to regulate the strength of the air pick-off signal, or to remove it, at the will of the operator.

This composite valve assembly is designated generally by the numeral 50 and comprises a cap 51 receiving the flexible connections 45 and 46, a thin valve disc 52, a metering disc 53, a resilient disc 54, and a bottom plate 55, as shown in Figures 9 and 10. The cap 51 is provided with a central hub 56 adapted to receive the discs 52 to 55, and a guide post 57 also receivable therein. The hub 56 has incorporated therein a screw 58 for mounting the whole assembly on the mounting frame floor 49 in the manner shown, the parts being secured by a nut 59. The post 57 enters an opening in the floor 49 to prevent rotation of the elements 51, 54 and 55 and to limit the rotation of the discs 52 and 53. The flexible hose connections 45 and 46 communicate with orifices 60 and 61 in the cap 51 which are aligned with slightly larger openings 62 and 63 in the discs 54, openings 64 and 65 in the disc 55, and similar openings in the floor 49, one of which is shown at 66 in Figure 9. Arcuate slots 67 and 68 in discs 52 and 53 receive the post 57 which operates as a stop to determine the limits of angular movement of these discs. The discs 54 and 55 have circular openings 69 and 70 in which the post 57 is received to prevent rotation of these elements.

The disc 53 is provided with a pair of openings 71 and 72 whose outer edges are cut on a spiral to meter the air flow through the openings 60 and 61. The edges of the metering openings are adapted to gradually vary the cross sectional area of the air passages between fully open and fully closed positions as the disc is rotated by the ear 73 under the actuation of a connecting link 74 having manipulatable operating means at the front of the mounting frame just below the front panel of the box 2.

The disc 52 has a pair of small openings 75 and 76 of approximately the same size as the openings 60 and 61 and registering therewith in one position of the disc. An ear 77 on this disc is arranged for movement by an armature 78 which is normally urged by a spring 79 in a direction to maintain the disc 52 in open position, this position being indexed by abutment of the end of slot 67 against the post 57. A solenoid 80 is arranged for actuation of the armature 78 to rotate the disc 52 in the opposite direction to close the air passages. The solenoid operating mechanism is carried by a frame element 81 having the armature 78 pivoted thereto at 82 as shown in Figures 6 and 8.

In Figure 6 the valve disc 52 is shown in its normal open position permitting a normal signal to be transmitted to the air relay 40 of a strength as determined by the setting of the link 74 controlling the metering valve disc 53. In Figure 8, the metering valve disc 53 is assumed to remain in the same position as in Figure 6 to give the same strength of signal, but the shutoff valve disc 52 has been rotated by actuation of the solenoid 80 to temporarily cut off the signal to the rudder operating mechanism.

The solenoid circuit is energized from a battery source connected to conductors 34 and 36 shown in Figures 2 and 5. The conductors 35 and 37 proceed along the mounting frame 10 from the terminal 32 and binding post 38 to the solenoid 80, whereby the conducting ring 23 associated with the banking knob 6 is adapted to complete a circuit thereto, through conductors 26 and 27 and spring contacts 29 and 30, when the climb and bank unit 1 is in its proper position in the mounting frame. The unit 1 may be removed and replaced in the usual manner without disconnecting any of the above mentioned conductors, the necessary circuit connections being automatically broken and re-established by the spring contacts 29 and 30.

*Operation*

Thus the present invention provides for removing the rudder signal from the rudder operating mechanism while making a turn and for leaving the rudder under gyro control for normal flight. When it is desired to make a turn, the aileron knob 6 is rotated to properly bank the aircraft into the turn and at the same time it is pushed in to the "in" position. As long as the knob is left in its "in" position, the solenoid 80 remains energized to remove the rudder signal so that the gyro turn unit exerts no influence on the rudder control mechanism during this interval.

When it is desired to come out of the turn, the aileron knob 6 is rotated to remove the bank and is at the same time withdrawn to its "out" position. This operates to break the circuit through the solenoid 80 to allow the spring 79 to rotate the shutoff valve disc 52 to open position to restore the rudder signal. The gyro turn unit is then effective to control the rudder to maintain the aircraft on whatever new course is set into the turn unit through the rudder control knob 3. Also, if it is desired to temporarily remove the rudder signal for any other purpose whatever, this may be expediently accomplished by merely snapping the aileron knob 6 into its "in" position without the necessity of interfering with the metering valve or other manual valve controls in the air or hydraulic systems.

An advantage of the foregoing arrangement is that it may be used selectively and conveniently without reaching for and manipulating an additional knob or lever. A further advantage is that all parts of the novel mechanism may be applied to conventional automatic pilots without material alterations. When the device is installed on the automatic pilot it does not interfere in any way with the conventional operation of either the bank and climb or the turn units unless it is desired to do so, and it does not interfere with the facility of removing or exchanging these units in the mounting frame.

Although a primary advantage of the present arrangement is its adaptability as an accessory device to a complete, serviceable gyro pilot, it is to be understood that the principles of the invention may be applied by way of modification and redesign so that certain of the external elements will be contained within the components of the gyro pilot as integral parts thereof.

Various changes, therefore, may be made in the construction and arrangement of parts, and all such modifications are included in the invention, the same being limited only by the scope of the appended claims.

I claim:

1. In an automatic pilot for aircraft having rudder and aileron control units, a mounting frame removably receiving said units, an air relay on said mounting frame for applying said rudder control, an air supply in said mounting frame for said relay, a valve on said mounting frame for shutting off said air supply, an aileron control knob, on said aileron control unit, and electromagnetic means on said mounting frame actuated by the aileron control knob for operating said valve to render said rudder control unit ineffective.

2. In an automatic pilot for aircraft, a mounting frame, having an air relay for applying rudder control and an air supply for said relay, air passages establishing communication between said air supply and said relay, a pair of plates on said mounting frame having aligned openings communicating with said air passages, a valve disc having a pair of openings adapted to be rotated into and out of registry with said plate openings, an aileron control knob, and electromagnetic means on the mounting frame actuated by the aileron control knob to rotate said disc to cut off the air supply in both passages to eliminate said rudder control.

3. In an automatic pilot for aircraft, a mounting frame, an air relay on said mounting frame for applying rudder control, an air supply manifold on said mounting frame, a pair of openings out of said manifold for supplying air to said relay, a plate having a pair of openings positioned for registry with said first mentioned openings, an aileron control knob, and electromagnetic means actuated by the aileron control knob for moving said plate to cut off said air supply to said relay.

4. In an automatic pilot for aircraft, a mounting frame having an air relay for applying rudder control and an air supply manifold for supplying air to said relay, an air valve comprising a plate having openings communicating with said manifold, a cap having openings aligned therewith and communicating with said air relay, a disc between said plate and said cap having openings positioned for registry with said plate and cap openings, an armature for rotating said disc, an aileron control knob, and a solenoid actuated by the aileron control knob for actuating said armature to cut off said air supply to said relay.

5. In an automatic pilot for aircraft having an air relay for applying rudder control and an air supply manifold for supplying air to said relay; a combined metering and shutoff valve comprising a bottom plate having a pair of openings communicating with said manifold, a cap having a pair of openings communicating with said relay and aligned with said first openings, a rotatable metering disc therebetween having openings arranged to meter the flow through said disc and aligned openings upon rotation of said disc, and a rotatable shutoff disc between said plate and said cap having a pair of openings positioned for registry with said aligned openings in said plate and cap and adapted upon rotatiton to shut off said air flow to remove said rudder control without affecting the setting of said metering disc.

6. In an automatic pilot for aircraft having an air relay to apply rudder control and an air supply for said relay; a combined shutoff and metering valve comprising a bottom plate and a top cap, aligned openings through said plate and cap communicating with said manifold and said relay, a central hub and a stop pin extending between said cap and said plate, a metering disc rotatably mounted on said hub and provided with metering openings arranged to meter the flow to said relay upon rotation of said disc, said disc having an arcuate slot for receiving said stop pin, and a shutoff disc rotatably mounted on said hub and having an arcuate indexing slot for receiving said stop pin, said shutoff disc having a pair of openings positioned for registry with said aligned openings and adapted upon rotation to shut off the air supply to said relay to eliminate said rudder control function without affecing the setting of said metering disc.

7. In an automatic pilot for aircraft having a mounting frame removably carrying a turn unit box and a bank and climb unit box, an air relay on said mounitng frame for applying rudder control, an air supply manifold on said mounting frame for supplying air to said relay, an air valve on said mounting frame for shutting off said air supply for said relay, electromagnetic means on said mounting frame for operating said valve, a pair of contacts on said mounting frame adjacent said bank and climb unit, a pair of contacts on said bank and climb unit adapted to engage said mounting frame contacts when said unit is received in said mounting frame, an aileron control knob on said bank and climb unit, and switch means associated with said aileron control knob for actuating said electromagnetic means to remove the signal to said air relay to interrupt the rudder controlling function of said automatic pilot.

8. In an automatic pilot for aircraft having a mounting frame and removable turn and bank and climb units for producing control signals, a signal responsive air relay on said mounting frame for applying rudder control, electromagnetic means on said mounting frame for removing said signal to interrupt said rudder control, contacts on said mounting frame and said bank and climb unit arranged for mutual engagement when said bank and climb unit is received in said mounting frame, an aileron control knob on said bank and climb unit, and switch means associated with said aileron control knob for controlling said electromagnetic means through said contacts.

BERT G. CARLSON.

REFERENCES CITED

The following references are of record in the file of this patent:

UNITED STATES PATENTS

| Number | Name | Date |
|---|---|---|
| 1,897,285 | Veit | Feb. 14, 1933 |
| 1,992,970 | Sperry Jr. et al. | Mar. 5, 1935 |
| 2,144,614 | Carlson | Jan. 24, 1939 |
| 2,144,616 | Carlson | Jan. 24, 1939 |
| 2,197,898 | Roland et al. | Apr. 23, 1940 |
| 2,238,300 | Zand et al. | Apr. 15, 1941 |
| 2,270,875 | Hanson et al | Jan. 27, 1942 |
| 2,283,754 | Matthews | May 19, 1942 |
| 2,316,235 | Gast | Apr. 13, 1943 |
| 2,354,244 | Carlson et al. | July 25, 1944 |